(12) United States Patent
Bruckner et al.

(10) Patent No.: US 7,831,617 B2
(45) Date of Patent: Nov. 9, 2010

(54) RE-CATEGORIZATION OF AGGREGATE DATA AS DETAIL DATA AND AUTOMATED RE-CATEGORIZATION BASED ON DATA USAGE CONTEXT

(75) Inventors: Robert M. Bruckner, Redmond, WA (US); Christopher A. Hays, Monroe, WA (US); Fang Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/459,859

(22) Filed: Jul. 25, 2006

(65) Prior Publication Data

US 2008/0027957 A1    Jan. 31, 2008

(51) Int. Cl.
  *G06F 17/30* (2006.01)
  *G06F 7/00* (2006.01)
(52) U.S. Cl. .................. 707/783; 707/713; 707/752; 707/769
(58) Field of Classification Search ............... None
  See application file for complete search history.

(56) References Cited

U.S. PATENT DOCUMENTS

| | | | |
|---|---|---|---|
| 5,781,896 A | 7/1998 | Dalal | |
| 5,822,751 A | 10/1998 | Gray et al. | |
| 5,832,475 A | 11/1998 | Agrawal et al. | |
| 6,163,774 A | 12/2000 | Lore et al. | |
| 6,247,008 B1 | 6/2001 | Cambot et al. | |
| 6,295,527 B1 | 9/2001 | McCormack et al. | |
| 6,385,604 B1 | 5/2002 | Bakalash et al. | |
| 6,405,207 B1 | 6/2002 | Petculescu et al. | |
| 6,480,836 B1 * | 11/2002 | Colby et al. | 707/3 |
| 6,493,700 B2 | 12/2002 | Couch et al. | |
| 6,996,569 B1 | 2/2006 | Bedell et al. | |
| 2002/0184187 A1 | 12/2002 | Bakalash et al. | |
| 2003/0208506 A1 | 11/2003 | Greenfield et al. | |
| 2005/0278738 A1 | 12/2005 | Kaneko et al. | |
| 2005/0283494 A1 | 12/2005 | Colossi et al. | |
| 2006/0020580 A1 | 1/2006 | Dettinger et al. | |

OTHER PUBLICATIONS

International Search Report dated Jan. 4, 2008 for PCT Application Serial No. PCT/US2007/016331, 2 Pages.

(Continued)

*Primary Examiner*—Greta L Robinson
*Assistant Examiner*—James J Wilcox
(74) *Attorney, Agent, or Firm*—Workman Nydegger

(57) ABSTRACT

A data access system which includes the capability to categorize subsets of the data in the data store, query result or other source of data as aggregate data or as detail data and also the ability to explicitly re-categorize the aggregate data as detail data, e.g., as part of execution of one or more processes on the data, so that operations that apply to detail data also apply to the re-categorized aggregate data. Additionally, automatic processes are provided for re-categorizing aggregate data as detail data based on data usage context, i.e., based upon how data in the data store is to be manipulated, processed and/or presented according to queries, commands, etc. received by the data store. Calculation of aggregations on top of already pre-aggregated data is enabled, and merging of designated aggregate data with detail data provides increased flexibility in a final dataset.

20 Claims, 10 Drawing Sheets

Table 400

| | Sales Country | Sales Region | Order Count | Metadata or Tag |
|---|---|---|---|---|
| r1 | USA | Northeast | 10 | Detailed |
| r2 | USA | Northwest | 5 | Detailed |
| r3 | USA | Southeast | 5 | Detailed |
| r4 | USA | Southwest | 10 | Detailed |
| r5 | USA | ALL | 30 | Aggregate |
| r6 | Canada | East | 10 | Detailed |
| r7 | Canada | West | 10 | Detailed |
| r8 | Canada | ALL | 20 | Aggregate |
| r9 | ALL | ALL | 50 | Aggregate |

Must be explicitly requested as Aggregate Data, or Calculated from underlying Detailed Data Total = 150  Wrong Total = 50  Right

OTHER PUBLICATIONS

J. Gray, A. Bosworth, A. Layman, and H. Pirahesh, "Data Cube: A Relational Aggregation Operator Generalizing Group-By, Cross-Tab, and Sub-Totals," Data Mining and Knowledge Discover, vol. 1, No. 1, 1997, pp. 29-53. ftp://ftp.research.microsoft.com/pub/tr/tr-97-32.doc.

S. Agarwal, R. Agrawal, P. M. Deshpande, A. Gupta, J. F. Naughton, R. Ramakrishnan, and S. Sarawagi. On the computation of multidimensional aggregates. In Proc. 22nd VLDB, pp. 506-521, Mumbai, Sep. 1996. http://citeseer.ist.psu.edu/agarwal96computation.html.

Craig S. Mullins, "Using CASE Expressions," SQL Server Update (Xephon) Aug. 1999. http://www.craigsmullins.com/ssu_0400.htm.

* cited by examiner

100 {
```
SELECT
NON EMPTY { [Measures].[Order Count] } ON COLUMNS,
{
  [Sales Territory].[Europe],
  [Sales Territory].[Pacific],
  [Sales Territory].[Canada],
  [Sales Territory].[Northeast],
  [Sales Territory].[Northwest],
  [Sales Territory].[Southeast],
  [Sales Territory].[Southwest]
}
ON ROWS FROM [Adventure Works]
```

FIG. 1

Table 200

| Sales Territory Group | Sales Territory Country | Sales Territory Region | Order Count |
|---|---|---|---|
| Europe — STG1 | (null) | (null) | 8504 — OC1 |
| Pacific — STG2 | (null) | (null) | 6843 — OC2 |
| North America — STG3 | Canada — STC1 | (null) | 4067 — OC3 |
| North America — STG3 | United States — STC2 | Northeast — STR1 | 352 — OC4 |
| North America — STG3 | United States — STC2 | Northwest — STR2 | 4594 — OC5 |
| North America — STG3 | United States — STC2 | Southeast — STR3 | 486 — OC6 |
| North America — STG3 | United States — STC2 | Southwest — STR4 | 6224 — OC7 |

210 Sales Territory Group
220 Sales Territory Country
230 Sales Territory Region
240 Order Count

FIG. 2

Report 300

| Sales Region | Order Count |
|---|---|
| Europe | 8504 |
| Pacific | 6843 |
| Canada | 4067 |
| Northeast | 352 |
| Northwest | 4594 |
| Southeast | 486 |
| Southwest | 6224 |

310 — Sales Region column
320 — Order Count column

STG1 — Europe row; OC1 — 8504
STG2 — Pacific row; OC2 — 6843
STC1 — Canada row; OC3 — 4067
STR1 — Northeast row; OC4 — 352
STR2 — Northwest row; OC5 — 4594
STR3 — Southeast row; OC6 — 486
STR4 — Southwest row; OC7 — 6224

FIG. 3

Table 400

| | Sales Country (410) | Sales Region (420) | Order Count (430) | Metadata or Tag (440) |
|---|---|---|---|---|
| r1 | USA | Northeast | 10 | Detailed |
| r2 | USA | Northwest | 5 | Detailed |
| r3 | USA | Southeast | 5 | Detailed |
| r4 | USA | Southwest | 10 | Detailed |
| r5 | USA | ALL | *30* | Aggregate |
| r6 | Canada | East | 10 | Detailed |
| r7 | Canada | West | 10 | Detailed |
| r8 | Canada | ALL | *20* | Aggregate |
| r9 | ALL | ALL | *50* | Aggregate |

Must be explicitly requested as Aggregate Data, or Calculated from underlying Detailed Data Total = 150   Wrong Total = 50   Right

FIG. 4

Table 500

|  | Country | Sales Region | Order Count | Metadata/Tag |
|---|---|---|---|---|
| r1 | USA | Northeast | 10 | Detailed |
| r2 | USA | Northwest | 5 | Detailed |
| r3 | USA | Southeast | 5 | Detailed |
| r4 | USA | Southwest | 10 | Detailed |
| r8 | Canada | ALL | 20 | Aggregate |

*Total = 30*

FIG. 5

Table 500

|  | Country | Sales Region | Order Count | Metadata/Tag |
|---|---|---|---|---|
| r1 | USA | Northeast | 10 | Detailed |
| r2 | USA | Northwest | 5 | Detailed |
| r3 | USA | Southeast | 5 | Detailed |
| r4 | USA | Southwest | 10 | Detailed |
| r8 | Canada | ALL | 20 | Aggregate |

FIG. 6A

May wish to recategorize as Detailed

Table 600

|  | Country | Sales Region | Order Count | Metadata/Tag |
|---|---|---|---|---|
| r1 | USA | Northeast | 10 | Detailed |
| r2 | USA | Northwest | 5 | Detailed |
| r3 | USA | Southeast | 5 | Detailed |
| r4 | USA | Southwest | 10 | Detailed |
| r8' | Canada | ALL | 20 | Detailed |

FIG. 6B

Total = 50

Recategorize

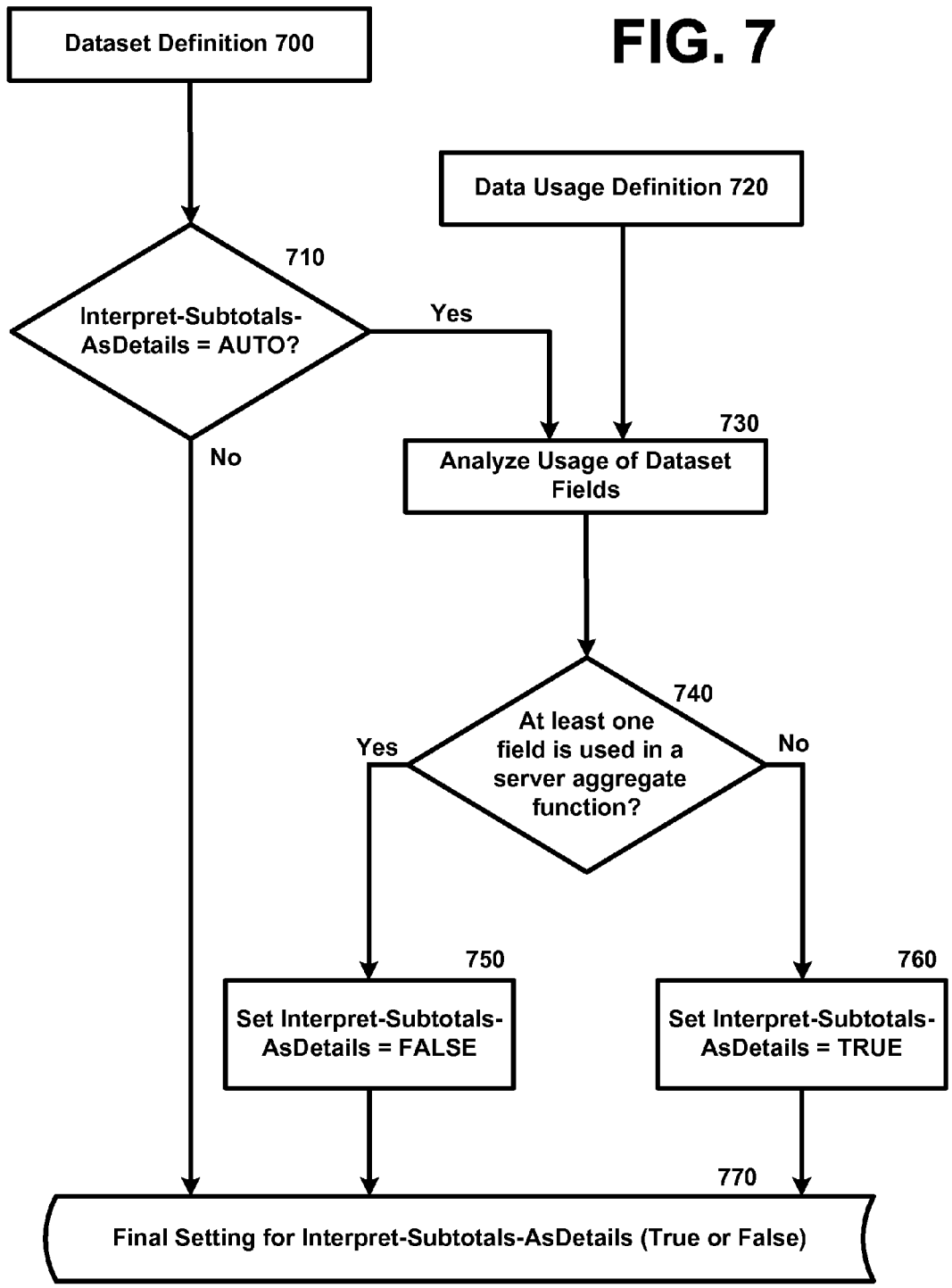

RE-CATEGORIZATION OF AGGREGATE DATA AS DETAIL DATA AND AUTOMATED RE-CATEGORIZATION BASED ON DATA USAGE CONTEXT

FIELD OF THE INVENTION

The present invention relates to the re-categorization of data stored in a data store or retrieved in a query. More particularly, the present invention relates to the re-categorization of data in a data store or query that is typed or classified as aggregate, or subtotal, data into data typed or classified as detail data. The invention also relates to corresponding techniques for automatically re-categorizing aggregate, or subtotal, as detail data under pre-defined data usage circumstances.

BACKGROUND

When reporting data from relational databases, there are commonly cases wherein the data, to be useful as a result, is grouped and/or aggregated by a user or application. For example, when reporting on sales for a company, a mere list of every transaction does little good to the CEO of the company when making business decisions. Instead, the CEO requires a higher level view of the transaction data than such detail data at the lowest level of the data hierarchy. By grouping and aggregating the data into meaningful categories, e.g., total sales broken down by product and/or region, the transaction data is transformed into such higher level information based upon which appropriate higher level action can be taken.

Certain systems, such as relational databases, allow flexible, but often very complex approaches to writing queries that can compute aggregations on top of detail data. On the other hand, systems, such as On Line Analytical Processing (OLAP) systems, have their strengths in pre-computed or custom aggregations. In OLAP systems, the queries often explicitly specify which data is shown in the result set (often allowing aggregate data of varying hierarchy granularity levels). For example, a typical query for analyzing sales/order data might not follow traditional aggregation levels (such as continent, country, and region), but rather, it might match organizational structures (such as European sales division, Canadian sales division, US NorthWest sales division, etc.), which is an example set forth in more detail below.

FIG. 1, for instance, depicts exemplary non-limiting query instructions 100, e.g., multidimensional query language (MDX) query instructions, for producing a view on a data set. In this example, query code 100 is primarily a SELECT statement, which returns a result set of records from one or more tables, i.e., zero or more rows from one or more tables in a database. For some additional background, in specifying a SELECT query, the user specifies a description of the desired result set, but they do not specify what physical operations must be executed to produce that result set. Translating the query into an optimal "query plan" is left to the database system, more specifically, to a query optimizer component.

FIG. 2 illustrates an exemplary table construct 200 reflecting the query results from execution of the query 100. Table 200 shows that the query 100 implicates aggregation of underlying order transaction data at three different aggregation levels: Territory Group 210, Country 220 and Region 230. Territory Group 210 is broken down into at least a European territory group STG1, a Pacific territory group STG2 and a North American territory group STG3. Sales territory countries 220 are broken down into at least a Canadian territory country STC1 and United States territory country STC2. Sales territory regions 230 are broken down for the United States sales territory country STC2 as Northeast sales territory region STR1, Northwest sales territory region STR2, Southeast sales territory region STR3 and Southwest sales territory region STR4. Where a country 220 or region 230 does not apply to a territory group 210, as shown, the null value is recorded in table 200.

FIG. 2 includes a fourth column, order count 240, which stores the aggregation or subtotal of the number of orders that have been received from a particular group, country and/or region. As mentioned above, since Europe and the Pacific are supersets of countries and regions, the first two rows of table 200 having order counts OC1 and OC2, respectively, illustrate a first level of aggregation performed on the underlying data according to the organizational view that all sales from Europe and the Pacific are to be treated as single views. Also, in this organizational view, for purposes of order count OC3, Canada is treated as an entire country STC1 within a territory group 210, but which has no regions 230, and thus represents a second level of aggregation performed on the underlying data. Furthermore, as a third level of aggregation applied to the underlying data, the United States territory country STC2 associated with North America territory group STG3 is further broken down into subregions 230 as Northeast STR1, Northwest STR2, Southeast STR3 and Southwest STR4 having aggregate counts OC4, OC5, OC6 and OC7, respectively.

In this regard, as shown in FIG. 3, the desired output or report 300 that is displayed to a user via an application or the like for this query includes a sales region dimension 310 and an associated order count 320. For each sales region, the order count 320 is displayed so that the CEO can maintain these aggregate views of the data at the three different levels described above. Today some systems that access databases enable a user or application to designate the output of an aggregation operation, or subtotal, of data as "aggregate" data, in contrast to the "detail" data upon which operations were performed to form the "aggregate" data. In the above example, for instance, exemplary detail data would be each order individually listed as a record, including all of the data recorded for each order (shipping, billing, location, etc.). In contrast to such detail data, the aggregate data that resulted from executing the query 100, i.e., order counts OC1, OC2, OC3, OC4, OC5, OC6, OC7 of FIG. 2, while having particular meaning to the organization as a whole, has a different meaning as aggregate data in database terms. Put simply, order counts 240, once designated as aggregate data, are treated by the database separately from the detail data from which the aggregate data sprung forth.

The reason for this separate treatment of aggregate data and detail data in some query languages can be explained with reference to FIG. 4. As shown, table 400 includes nine rows r1, r2, r3, r4, r5, r6, r7, r8, r9 with columns sales country 410, sales region 420 and order count 430. Each order count 430, as shown, is explicitly tagged as either Detail data or Aggregate data per metadata or tag 440 associated with the data values. One of skill in the art can appreciate tag or metadata 440 could also be implemented as a column of the database. With Aggregate or Detail tags 440, when a query command is executed over the data in table 400 that, for instance, sums all of the orders over all of the data, the Aggregate data values are ignored in the calculation when adding up the values of rows r1, r2, r3, r4, r6 and r7, i.e., the values of rows r5, r8 and r9 are ignored in the calculation. To implicate an Aggregate value, the command language must explicitly request or calculate such a value distinctly from operations on the Detail data. This way, the sum of all orders will ignore rows r5, r8 and r9 when adding up the detail data of rows r1, r2, r3, r4, r6 and r7 to reach a total order count of 50. If it were not known to ignore the aggregate order counts of rows r5, r8 and r9, such order counts (highlighted by the bold bordering of the cells) would be included in the summing operation, yielding an incorrect result of 150.

As mentioned, the aggregate order counts of rows r5, r8 and r9 must be explicitly requested or calculated afresh as part of query execution, or else the order counts of rows r5, r8 and r9 will be skipped when the query is executed. However, for any of a variety of reasons, sometimes a user or application may nonetheless wish to re-categorize aggregate data as detail data, e.g., as the needs of an organization change.

For instance, as shown in FIG. 5, suppose a table 500 is desired which only includes rows r1, r2, r3, r4 and r8 of FIG. 4, which might happen to the organization if the East and West sides of the Canadian operation are merged under a single umbrella. Regardless of the reason, table 500 of FIG. 5 supposes a better view of the data; however, aggregating over all the detail data in table 500 yields the incorrect total of 30. In this case, the order count of 20 of r8 is ignored as aggregate data. Yet, presently, there is no way to re-categorize the aggregate data as detail data so that it is properly tallied in an aggregation query.

Accordingly, what is desired is a method by which already aggregated data can be easily re-categorized as detail data, or merged with detail data to operate on the aggregate data as detail data. What is further desired is a method by which aggregate data can be automatically re-categorized as detail data, or merged with detail data, where it is appropriate based on the usage of the data.

SUMMARY OF THE INVENTION

In view of the foregoing, where a query-able data store, such as a relational database or OLAP system, includes the capability to categorize data in the data store as aggregate data, e.g., for the result of an aggregation query, or to categorize the data in the data store as detail data, e.g., for underlying records or transactions in the data store upon which aggregate operations are based, the present invention provides the ability to explicitly or automatically re-categorize the aggregate data as detail data, e.g., as part of a query execution, so that operations that apply to detail data apply to the re-categorized aggregate data. In various non-limiting embodiments, the invention provides automatic processes for re-categorizing aggregate data as detail data based on data usage context, i.e., based upon how data in the data store is to be manipulated, processed and/or presented according to queries, commands, etc. received by the data store. The methods enable the calculation of aggregations on top of already pre-aggregated data and enables merging of designated aggregate data with detail data providing increased flexibility in a final dataset (e.g. for reporting).

Other features of the present invention are described below.

BRIEF DESCRIPTION OF THE DRAWINGS

The system and methods for re-categorizing aggregate data as detail data in accordance with the invention are further described with reference to the accompanying drawings in which:

FIG. 1 represents some exemplary pseudo-code for interacting with a data store;

FIG. 2 shows an exemplary hypothetical table of a data store and corresponding exemplary data stored in the table;

FIG. 3 shows a desired output from the hypothetical table of FIG. 2;

FIGS. 4 and 5 illustrate problematic issues arising from the inability to use aggregate data as detail data;

FIGS. 6A and 6B illustrate a solution in accordance with the invention whereby aggregate data is merged with, or re-categorized as detail data;

FIG. 7 illustrates an exemplary, non-limiting flow diagram for automatically analyzing the usage of data in a data store, and determining whether the data should be re-categorized as detail data for further processing in accordance with the invention;

DESCRIPTION OF ILLUSTRATIVE EMBODIMENTS

Figure 8:
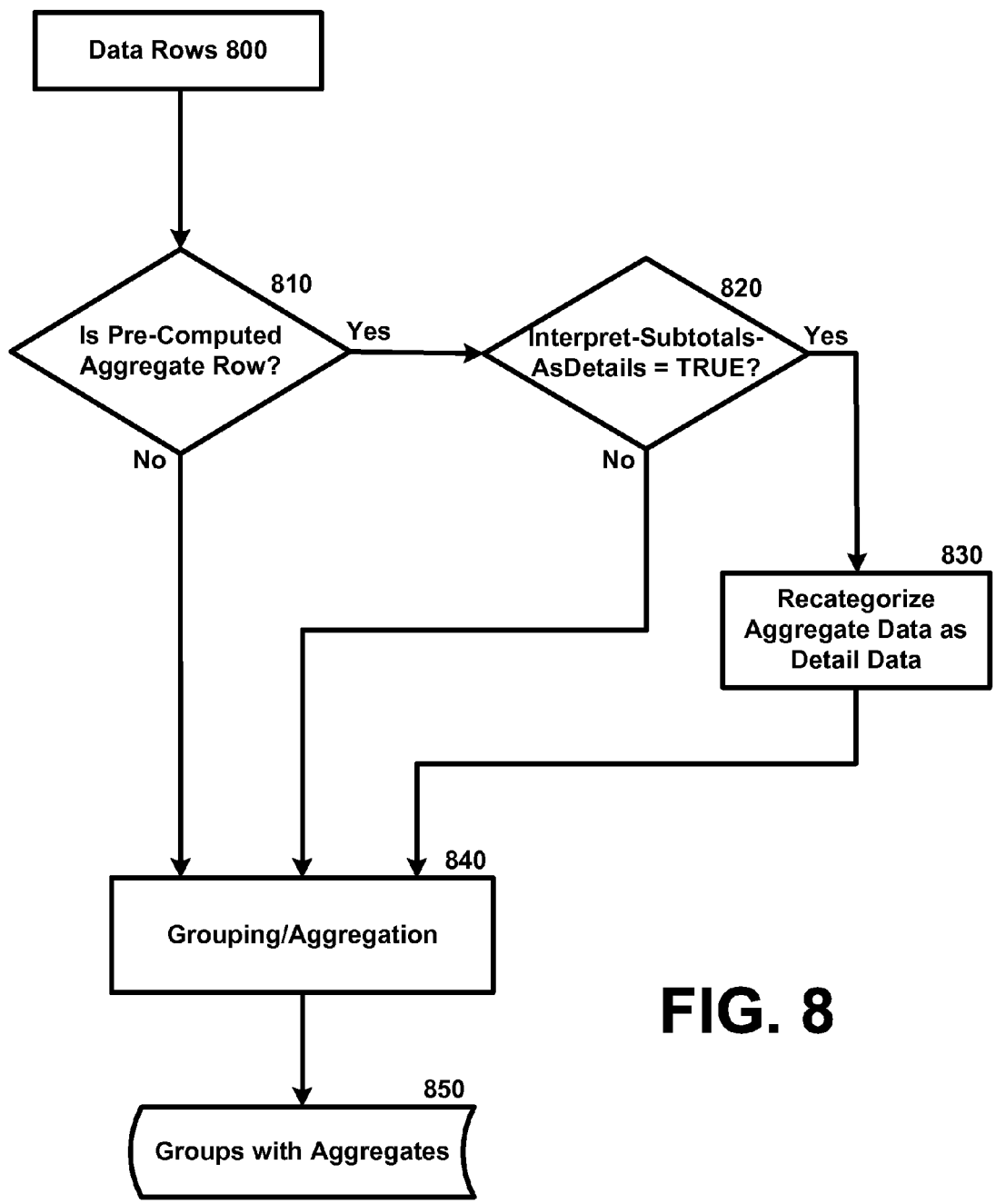
FIG. 8 illustrates an exemplary, non-limiting implementation of the invention wherein a flag is utilized to signal the re-categorization of aggregate data as detail data.

Overview of Re-Categorizing Aggregate Data as Detail Data

As mentioned in the background, there are a variety of situations when reporting data from relational databases, where output or report data, to be useful as a result, is grouped and/or aggregated by a user or application, to distinguish the aggregate result from the underlying detail data upon which the aggregate result is based. In such relational systems, the aggregate result is designated as aggregate data. Other systems, such as OLAP systems, have particular strengths because of their pre-computed or custom aggregations performed in the background, saving valuable query processing time in certain circumstances. With such OLAP systems, instead of calculating custom aggregate results based on underlying detail data, the queries enable explicit specification of which data including pre-computed aggregate data should be shown in the result set (at potentially varying aggregation levels).

However, there is no way in such data storage systems to re-categorize the aggregate data as detail data, where it is desirable to do so, for example, to perform aggregations on top of aggregate data or to otherwise operate upon the aggregate data as if it were detail data. Accordingly, the invention provides the ability to re-categorize aggregate data as detail data, or otherwise operate on the aggregate data as if it were categorized as detail data. For instance, aggregate data can be merged with detail data, and operated upon alongside the detail data.

Additionally, the invention recognizes that certain usage of aggregate data often implies that the aggregate data ought to be re-categorized as detail data since the intended usage by the user, application, service, etc. forming the query implicates that certain aggregate data be processed as detail data. In such cases, the invention enables the automatic re-categorization of the aggregate data as detail data. As described above, FIG. 5 shows but one non-limiting example of a circumstance wherein it is desirable to re-classify aggregate data as detailed data. As reflected by FIG. 6A, table 500 of FIG. 5 is reproduced to serve as exemplary circumstances where it is desirable to re-classify a row r8 as detail data for use in connection with a summing operation along with the rest of the detail data.

Accordingly, as shown in table 600 of FIG. 6B, one way in which the re-categorization techniques of the invention may be utilized is by explicitly changing the designation of row r8 from aggregate data to detail data, as shown for row r8' in FIG. 6B. As a result, when execution on the data as detail data is called for, such as when an aggregate function is executed across the detail data, the data from row r8' is properly included in the result, i.e., the correct Total of the order counts 430 is calculated correctly to be 10+5+5+10+20=50. In a similar fashion, instead of explicitly re-categorizing the aggregate data as detail data, the aggregate data can be merged with other detail data as part of an operation that executes on both the aggregate data and the detail data as if it were detail data. In this fashion, any scenario wherein it is desirable to aggregate calculations on top of pre-aggregated data, and further optionally on top of other pre-aggregated data, and so on, is enabled by the re-categorization of aggregate data as detail data in accordance with the invention.

The invention thus enables the re-categorization of aggregate (subtotal) data as detail data and also enables the automatic application of such re-categorization techniques based on the context of data usage implicated by a query operation on the data store.

Data Storage and Query Languages

The following description is intended to provide additional background and context for various non-limiting types of data storage, such as relational databases, and query languages, in connection with which the invention may be implemented; however, it can be appreciated that the techniques for re-categorizing aggregate data as detail data in accordance with the invention can be applied to any storage environment in which data can be designated as detail data or aggregate data in connection with querying operations over the data.

For further background, a relational database is a collection of data items organized as a set of formally-described tables from which data can be accessed or reassembled in many different ways without having to reorganize the database tables. In addition to being relatively easy to create and access, a relational database has the advantage of being extendable. For instance, after the original database creation, a new data category can be added to the database tables without requiring that all existing applications be modified.

More specifically, a relational database is a set of tables containing data that is fitted into predefined categories. Each table (which is sometimes called a relation) contains one or more data categories in columns. Each row contains a unique instance of data for the categories defined by the columns. For example, a typical business order entry database might include a table that describes a customer with columns for name, address, phone number, and so forth. Another table would describe an order: product, customer, date, sales price, and so forth. A user of the database can obtain a view of the database that fits the user's needs. For example, a branch office manager might like a view or report on all customers that had bought products after a certain date. A financial services manager in the same company could, from the same tables, obtain a view or report on accounts that are past an overdue payment time. Thus, the definition of a relational database results in a table of metadata or formal descriptions of the tables, columns, domains, and constraints.

As indicated above, OLAP is an acronym for On Line Analytical Processing. OLAP is an approach to quickly provide the answer to analytical queries that are dimensional in nature. The typical applications of OLAP are in business reporting for sales, marketing, management reporting, business performance management (BPM), budgeting and forecasting, financial reporting and similar areas.

Databases configured for OLAP employ a multidimensional data model, allowing for complex analytical and ad-hoc queries with a rapid execution time. An alternative term to describe the concept of OLAP is Fast Analysis of Shared Multidimensional Information (FASMI) because OLAP borrows aspects of navigational databases and hierarchical databases that are speedier than their relational kin.

While many query languages exist, a standard user and application program interface to a relational database is the structured query language (SQL). SQL statements are used both for interactive queries for information from a relational database and for gathering data for reports. SQL is thus a standard interactive and programming language/programming interface for getting information from and updating a database, usually on behalf of an application or service. With SQL, queries take the form of a command language that lets a user or application select, insert, update, find out the location of data, and so forth.

The SQL query language is used to access data in most simple databases, but for multidimensional or On Line Analytical Processing (OLAP) data warehouses, the Multidimensional Expression Language (MDX) was developed. MDX (Multidimensional Expressions) is a language used to access and manipulate MD (multidimensional) information and used to define multidimensional data selections and calculations in data stores, such as those defined by Microsoft's Object Linking & Embedding DataBase (OLEDB). MDX is also used as the calculation definition language in Microsoft's Analysis Services.

Thus, additional background and context has been provided for a variety of data storage and query languages, however, for the avoidance of doubt, the above-described data storage and query languages are not intended to be limiting on the invention. Thus, it should be appreciated that any data storage and query models and languages having the ability to designate data as aggregate or detail data can benefit from the techniques of the invention.

Additionally, for supplemental background regarding some exemplary non-limiting implementations of the present invention for re-categorizing aggregate data, one can review additional information about the SQL Server—Reporting Services IDataReaderExtension interface, which provides a means of reading one or more forward-only streams of result sets obtained by executing a command at a data source, and is used by Reporting Services to retrieve aggregation-specific information about a result set. Further information about the interface can be found at the following on-line knowledge base:

http://msdn.microsoft.com/library/default.asp?url=/library/en-us/RSPROG/htm/rsp_ref_clr_dataproc_9lit.asp. The IDataReaderExtension interface is but one non-limiting example of a mechanism for marking rows of a database as aggregate or detail data in accordance with the invention.

Also, further information about the publicly available, exemplary, non-limiting Report Definition Language (RDL) utilized in various embodiments herein can be found at the following location: http://www.microsoft.com/sql/technologies/reporting/rdlspec.mspx. RDL is an XML-based schema for defining reports. The goal of RDL is to promote the interoperability of commercial reporting products by defining a common schema that allows interchange of report definitions. To encourage interoperability, RDL includes the notion of compliance levels that products may choose to support.

Exemplary Non-Limiting Embodiments of Re-Categorization of Aggregate Data

As described generally above, the present invention is directed to query-able data storage computing environments, and enables re-categorization of aggregate (subtotal) data as detail data and automatic processes for performing the re-categorization based on the context of data usage. By allowing re-categorization of aggregate data as detail data, the method enables calculation of aggregations on top of already pre-aggregated data, and further enables merging of designated aggregate data, i.e., data aggregated by certain fields/dimensions and at potentially different levels of aggregation hierarchy, with detail, or non-aggregated, data for use in a final dataset, e.g., for a report.

Furthermore, in an exemplary non-limiting embodiment, the methods for re-categorizing designated aggregate data as detail data in accordance with the invention are automatically performed based on the context of how the data is being used, processed or requested, e.g., when data is requested in a certain way in a report. In a further embodiment, the methods for re-categorizing aggregate data as detail data are performed automatically based solely on the context of how the data is used, without reference to the underlying values stored in the database.

In a first non-limiting aspect, the invention includes a technique for auto-detecting whether a given piece of aggregate data in an underlying dataset should be re-categorized as detail data. In a second non-limiting aspect, the invention includes the ability to use designated aggregated data as a pre-computed result in aggregate functions directly, instead of requiring the calculation of the aggregates from the detail data which is only possible for additive aggregations, but not for custom aggregations. In yet another non-limiting aspect the invention includes the ability to use designated aggregated data as re-categorized detailed data.

By allowing re-categorization of aggregated data as detail data, this further enables applying aggregate functions on top of pre-aggregated data, allowing the treatment of the pre-aggregated data in the same way as detail data in aggregate functions, such as Avg. As a result, in such a case, a pre-aggregated data row, used as detail data in accordance with the re-categorization techniques of the invention, is able to have the same impact, e.g., same weight in an Avg calculation, as a detail data row.

FIG. 7 shows an exemplary, non-limiting flow diagram for an automated detection process in accordance with the invention, wherein aggregate (e.g., subtotal) data is automatically processed according to its usage context to determine whether the aggregate data should be treated as aggregate data or detail data (non-aggregate data). In this exemplary non-limiting embodiment, for every dataset having dataset definition 700, there is an optional setting provided in accordance with the invention called "Interpret-Subtotals-AsDetails" in the Report Definition Language (RDL). Though any suitable definition language can be used for this purpose, for further background, RDL is an XML representation of a report definition, which contains data retrieval and layout information for a report. RDL is an open schema such that developers can extend RDL with additional attributes and elements.

In this non-limiting embodiment, the default value for "Interpret-Subtotals-AsDetails" is "AUTO," indicated that the value is to be determined automatically based on the usage context of the dataset. Thus, if a user, application, service omits specifying the setting, the setting defaults to the value "AUTO".

Thus, whenever a dataset is received, definition 700 is examined at 710 to determine if Interpret-Subtotals-AsDetails is set to "AUTO." If, at 710, Interpret-Subtotals-AsDetails is not set to "AUTO," then it is set as either FALSE or TRUE. Whether set as FALSE or TRUE, the flow ends with the setting for Interpret-Subtotals-AsDetails remaining as FALSE or TRUE, respectively.

If, at 710, Interpret-Subtotals-AsDetails is set to "AUTO," the flow passes to 730 where an analysis of the usage of the dataset fields is performed, taking data usage definition 720 as input. Data usage definition 720 defines how datasets and dataset fields are used. More specifically, in the "AUTO" case, the entire report is analyzed at 740 to determine if the fields of that particular dataset are used in a server aggregate function (e.g., in Report Definition Language:=Aggregate(Fields-!FieldName.Value)). It is noted that a server aggregate function will automatically determine which pre-computed aggregate value from the underlying dataset is to be chosen based on the current scope of the use of the server aggregate function.

If, at 740, none of the current dataset's fields are used in a server aggregate function, AUTO maps Interpret-Subtotals-AsDetails as True at 760. At least one reason for this is as follows: if designated subtotal rows are present in the underlying dataset at runtime, but none of them are explicitly retrieved through the =Aggregate( . . . ) function, in a high percentage of cases, the original intention was to treat those subtotals as details (as discussed in the example above with merging data of varying aggregation levels to better match, e.g. an organizational hierarchy that does not directly map to an actual geographical hierarchy). If, at 740, there are fields of the dataset used in a server aggregate function, then at 750, Interpret-Subtotals-AsDetails is set to FALSE. Whether Interpret-Subtotals-AsDetails is set to FALSE at 750 or set to TRUE at 760 in the AUTO case, the flow of FIG. 7 proceeds to 770 where the setting of Interpret-Subtotals-AsDetails has been so determined.

In this fashion, based on how a dataset is used, e.g., in a query, or otherwise operated upon, the invention automatically re-categorizes aggregate data as detail data, where appropriate, unless a user or application explicitly sets Interpret-Subtotals-AsDetails to skip the automatic analysis.

In another aspect of the invention illustrated in the flow diagram of FIG. 8, the invention enables re-categorization of aggregate data as needed according to predetermined algorithm(s). In this regard, currently, the Reporting Services Data Extension interfaces specification already defines methods that enable marking of data rows explicitly as pre-aggregated (subtotal) rows and specifying the indexes of fields by which the value is aggregated (hence allowing multiple aggregation levels). However, there is no way through the interface to explicitly re-categorize subtotal rows as detail data.

Thus, in accordance with the invention, as shown in exemplary fashion in the flow diagram of FIG. 8, if a particular data row 800 is marked as aggregate data at 810 and Interpret-Subtotals-AsDetails is set to TRUE (explicitly or based on the auto-detection algorithm of FIG. 7) at 820, then, at 830, the aggregate data is re-categorized as detail data in accordance with the invention. Then, the row 800 can be used as detail data in any grouping/sorting/filtering/aggregation functions at 840 in the same way that detail data can be used. Hence, this particular set of subtotal values is not available to be retrieved as (pre-computed) server aggregate through the =Aggregate( . . . ) function. Instead, it is merged with the "regular" detail data and it can be used in grouping/sorting/filtering/aggregation functions the same way as detail data.

If either the row is not marked as aggregate data at 810 or Interpret-Subtotals-AsDetails is set to FALSE at 820 (either set explicitly or determined in AUTO case of FIG. 7), then no change is made to the row categorization, and the flow proceeds to 840 for grouping, aggregation, etc. functions. Any groups that are formed from any grouping, aggregation, etc. functions are grouped as aggregate data at 850.

In this way, multi-dimensional pre-computed aggregations gain similar flexibility for reporting purposes as relational data (e.g. by using the SQL UNION operator to join multiple datasets with different aggregations).

The application of the invention to multi dimensional data sources, such as OLAP data sources, is particularly advantageous because the pre-computation of aggregate data in such systems can be made even more powerful by allowing more flexible usage of the aggregate data by allowing flexible re-categorization as detail data, where appropriate in such systems and corresponding data usage scenarios.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with processes for re-categorizing aggregate data as detail data in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes. Data stores are ubiquitous in networks, and thus the techniques for re-categorizing aggregate data as detail data in accordance with the present invention can be applied with great efficacy in those environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate a data store and corresponding techniques for re-categorizing data in the data store in accordance with the invention.

Figure 9:
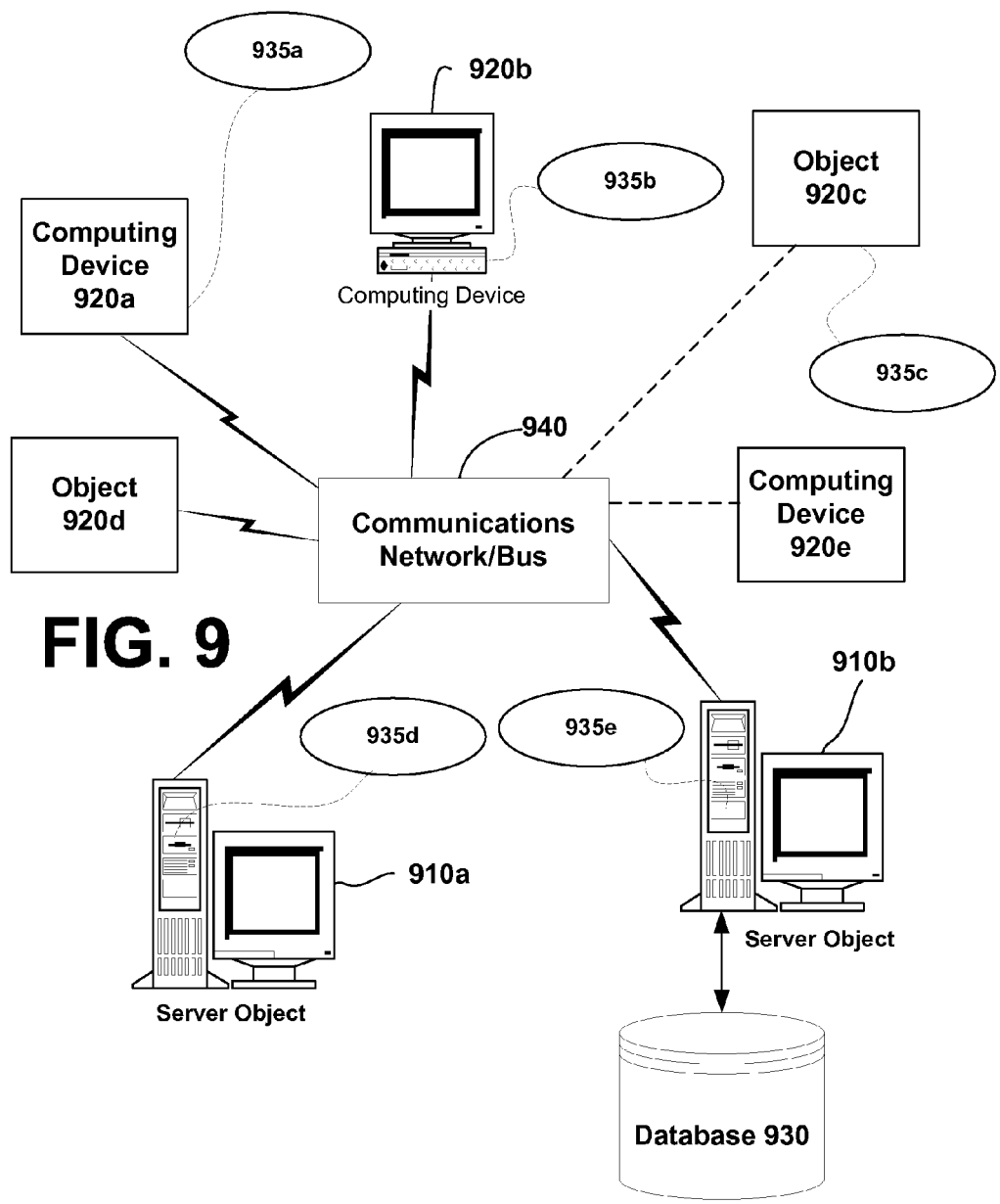
FIG. 9 is a block diagram representing an exemplary network environment in which the present invention may be implemented.

FIG. 9 provides a schematic diagram of an exemplary networked or distributed computing environment. The distributed computing environment comprises computing objects 910*a*, 910*b*, etc. and computing objects or devices 920*a*, 920*b*, 920*c*, 920*d*, 920*e*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 940. This network may itself comprise other computing objects and computing devices that provide services to the system of FIG. 9, and may itself represent multiple interconnected networks. In accordance with an aspect of the invention, each object 910*a*, 910*b*, etc. or 920*a*, 920*b*, 920*c*, 920*d*, 920*e*, etc. may contain an application that might make use of an API, or other object, software, firmware and/or hardware, suitable for use with the systems and methods for re-categorization in accordance with the invention.

It can also be appreciated that an object, such as 920*c*, may be hosted on another computing device 910*a*, 910*b*, etc. or 920*a*, 920*b*, 920*c*, 920*d*, 920*e*, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to communicating with a data store according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5 , Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 9, as an example, computers 920a, 920b, 920c, 920d, 920e, etc. can be thought of as clients and computers 910a, 910b, etc. can be thought of as servers where servers 910a, 910b, etc. maintain the data that is then replicated to client computers 920a, 920b, 920c, 920d, 920e, etc., although any computer can be considered a client, a server, or both, depending on the circumstances. Any of these computing devices may be processing data or requesting services or tasks that may implicate the re-categorization of data in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for re-categorizing aggregate data as detail data in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 9 illustrates an exemplary networked or distributed environment, with server(s) in communication with client computer (s) via a network/bus, in which the present invention may be employed. In more detail, a number of servers 910a, 910b, etc. are interconnected via a communications network/bus 940, which may be a LAN, WAN, intranet, GSM network, the Internet, etc., with a number of client or remote computing devices 920a, 920b, 920c, 920d, 920e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to access data of a data store.

In a network environment in which the communications network/bus 940 is the Internet, for example, the servers 910a, 910b, etc. can be Web servers with which the clients 920a, 920b, 920c, 920d, 920e, etc. communicate via any of a number of known protocols such as HTTP. Servers 910a, 910b, etc. may also serve as clients 920a, 920b, 920c, 920d, 920e, etc., as may be characteristic of a distributed computing environment.

As mentioned, communications may be wired or wireless, or a combination, where appropriate. Client devices 920a, 920b, 920c, 920d, 920e, etc. may or may not communicate via communications network/bus 14, and may have independent communications associated therewith. For example, in the case of a TV or VCR, there may or may not be a networked aspect to the control thereof. Each client computer 920a, 920b, 920c, 920d, 920e, etc. and server computer 910a, 910b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 910a, 910b, 920a, 920b, 920c, 920d, 920e, etc. may be responsible for the maintenance and updating of a database 930 or other storage element, such as a database or memory 930 for storing data processed or saved according to the invention. Thus, the present invention can be utilized in a computer network environment having client computers 920a, 920b, 920c, 920d, 920e, etc. that can access and interact with a computer network/bus 940 and server computers 910a, 910b, etc. that may interact with client computers 920a, 920b, 920c, 920d, 920e, etc. and other like devices, and databases 930.

Exemplary Computing Device

Figure 10:
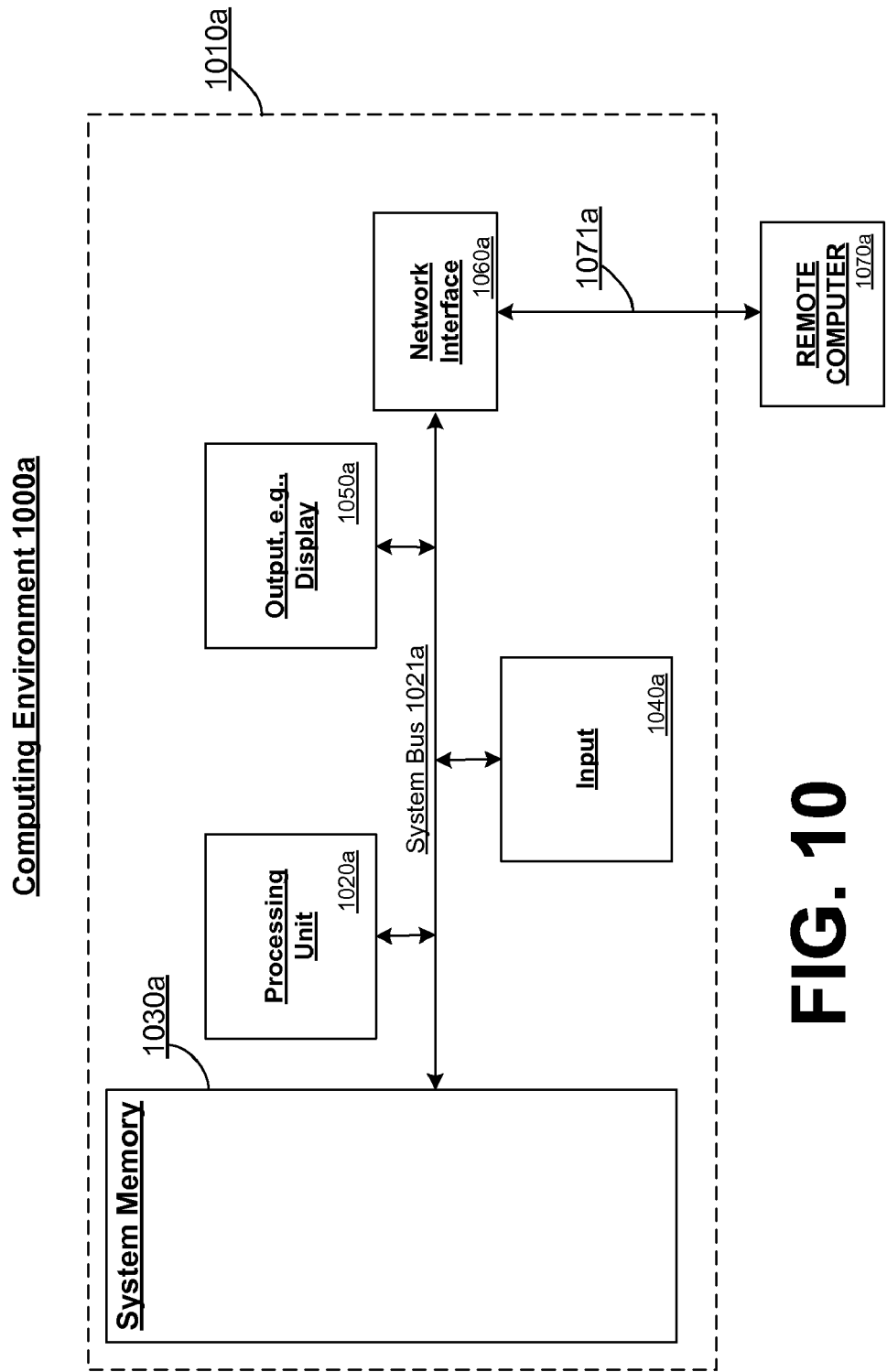
FIG. 10 is a block diagram representing an exemplary non-limiting computing system environment in which parts of the present invention may be implemented.

As mentioned, the invention applies to any device wherein it may be desirable to access data in a data store. It should be understood, therefore, that handheld, portable and other computing devices and computing objects of all kinds are contemplated for use in connection with the present invention, i.e., from anywhere that a device may request interaction with data of a data source or otherwise receive, process or store data from a data store. Accordingly, the below general purpose remote computer described below in FIG. 10 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 10 thus illustrates an example of a suitable computing system environment 1000a in which the invention may be implemented, although as made clear above, the computing system environment 1000a is only one example of a suitable computing environment for a media device and is not intended to suggest any limitation as to the scope of use or functionality of the invention. Neither should the computing environment 1000a be interpreted as having any dependency or requirement relating to any one or combination of components illustrated in the exemplary operating environment 1000a.

With reference to FIG. 10, an exemplary remote device for implementing the invention includes a general purpose computing device in the form of a computer 1010a. Components of computer 1010a may include, but are not limited to, a processing unit 1020a, a system memory 1030a, and a system bus 1021a that couples various system components including the system memory to the processing unit 1020a. The system bus 1021a may be any of several types of bus structures including a memory bus or memory controller, a peripheral bus, and a local bus using any of a variety of bus architectures.

Computer 1010a typically includes a variety of computer readable media. Computer readable media can be any available media that can be accessed by computer 1010a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010a. Communication media typically embodies computer readable instructions, data structures, program modules or other data in a modulated data signal such as a carrier wave or other transport mechanism and includes any information delivery media.

The system memory 1030a may include computer storage media in the form of volatile and/or nonvolatile memory such as read only memory (ROM) and/or random access memory (RAM). A basic input/output system (BIOS), containing the basic routines that help to transfer information between elements within computer 1010a, such as during start-up, may be stored in memory 1030a. Memory 1030a typically also contains data and/or program modules that are immediately accessible to and/or presently being operated on by processing unit 1020a. By way of example, and not limitation, memory 1030a may also include an operating system, application programs, other program modules, and program data.

The computer 1010a may also include other removable/non-removable, volatile/nonvolatile computer storage media. For example, computer 1010a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1021a through a non-removable memory interface such as an interface, and a magnetic disk drive or optical disk drive is typically connected to the system bus 1021a by a removable memory interface, such as an interface.

A user may enter commands and information into the computer 1010a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1020a through user input 1040a and associated interface(s) that are coupled to the system bus 1021a, but may be connected by other interface and bus structures, such as a parallel port, game port or a universal serial bus (USB). A graphics subsystem may also be connected to the system bus 1021a. A monitor or other type of display device is also connected to the system bus 1021a via an interface, such as output interface 1050a, which may in turn communicate with video memory. In addition to a monitor, computers may also include other peripheral output devices such as speakers and a printer, which may be connected through output interface 1050a.

The computer 1010a may operate in a networked or distributed environment using logical connections to one or more other remote computers, such as remote computer 1070a, which may in turn have media capabilities different from device 1010a. The remote computer 1070a may be a personal computer, a server, a router, a network PC, a peer device or other common network node, or any other remote media consumption or transmission device, and may include any or all of the elements described above relative to the computer 1010a. The logical connections depicted in FIG. 10 include a network 1071a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1010a is connected to the LAN 1071a through a network interface or adapter. When used in a WAN networking environment, the computer 1010a typically includes a modem or other means for establishing communications over the WAN, such as the Internet. A modem, which may be internal or external, may be connected to the system bus 1021a via the user input interface of input 1040a, or other appropriate mechanism. In a networked environment, program modules depicted relative to the computer 1010a, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for interfacing with a data store and methods for processing data in the data store including the re-categorization of aggregate data as detail data in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the techniques for re-categorizing aggregate data as detail data of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to interface with a data store, such as a relational data store or OLAP system. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the re-categorization techniques of the present invention, e.g., through the use of a data processing API, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a database or a data store in a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network—anywhere from which a data store may be accessible to a user, application or service. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for re-categorizing aggregate data as detail data. Still further, where implicated, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method for processing at least one subset of data in a dataset, comprising:
   automatically determining whether a portion of aggregate data is to be re-categorized from detail data to aggregate data based on both a data usage context that indicates how the data is currently being used, processed or requested and the current scope of at lease one associated aggregation query;
   based on the determination, re-categorizing at least one subset of data in the dataset from an aggregate data designation to a detail data designation stored on a computer readable storage medium by explicitly reclassifying the subset's data designation from aggregate data to detail data, the detail data comprising base level database data, the aggregate data comprising a combination of one or more portions of detail data, the aggregate data designation being mutually exclusive to the detail data designation, the re-categorizing including automatically re-categorizing the at least one subset of data from the aggregate data designation to the detail data designation based on an analysis of the usage of the at least one subset of data in an operation performed on the dataset, the usage including a user's usage of the at least one subset of data, wherein the analysis analyzes the user's usage of the data subset to determine how the user used the data subset;

performing an aggregation query across the detail data, the query being configured to return only detail data, wherein the aggregate data that would have otherwise been excluded from the results of the aggregation query is included in the result of the aggregation query because the aggregate data's classification was changed from aggregate to detail ; and applying one or more aggregate calculation functions on top of at least a portion of pre-aggregated data, such that the pre-aggregated data is treated in the same way as detail data in the aggregate calculation functions.

2. The method of claim 1, further including:
processing the re-categorized at least one subset of data as detail data together with at least one other subset of the same dataset having the detail data designation.

3. The method of claim 2, the at least one subset of data having been re-categorized according to the re-categorizing step, thereby allows calculation of aggregations on top of the already pre-aggregated data.

4. The method of claim 2, the processing includes merging the re-categorized at least one subset of data with the at least one other subset of data having the detail data designation.

5. The method of claim 2, the at least one subset of data includes at least two subsets of data that are aggregated by different fields or dimensions.

6. The method of claim 2, the processing includes at least one of grouping, filtering, aggregating and sorting the at least one subset of data as detail data together with the at least one other subset of data having the detail data designation.

7. The method of claim 1, the analysis is based at least on a dataset definition associated with the dataset.

8. The method of claim 1, the analysis is based at least on a data usage definition defining data usage of dataset fields of the dataset.

9. The method of claim 1, the re-categorizing includes automatically re-categorizing the at least one subset of data from the aggregate data designation to the detail data designation based on an analysis of the usage of dataset fields of the dataset in an operation performed on the dataset.

10. The method of claim 9, the re-categorizing includes automatically re-categorizing the at least one subset of data from the aggregate data designation to the detail data designation based on whether at least one field of the dataset is used in a server aggregate function.

11. The method of claim 1, the re-categorizing includes automatically re-categorizing the at least one subset of data from the aggregate data designation to the detail data designation based on an analysis of the usage of the at least one subset of data in an operation performed on the dataset only if a flag is set to automatically perform the automatic re-categorizing.

12. A computing device comprising means for performing the re-categorizing method of claim 1.

13. An interface to a data store comprising a computer readable storage medium including computer executable interface modules having computer executable instructions for performing the method of claim 1.

14. A computerized method for analyzing a request for at least one operation to be performed on at least one subset of data of a dataset, comprising:
receiving a request for at least one operation to be performed on at least one field of the dataset stored on a computer readable storage medium;
automatically determining whether a portion of aggregate data of the dataset is to be re-categorized from detail data to aggregate data based on both a data usage context that indicates how the data is currently being used, processed or requested and the current scope of at least one associated aggregation query;
based on the determination, automatically re-classifying the at least one subset of data from aggregate type data to detail type data based on the analyzing and automatic detection based on usage of the at least one field, the detail data comprising base level database data, the aggregate data comprising a combination of one or more portions of detail data, the usage including a user's usage of the at least one subset of data, wherein the analysis analyzes the user's usage of the data subset to determine how the user used the data subset;
performing an aggregation query across the detail data, the query being configured to return only detail data, wherein the aggregate data that would have otherwise been excluded from the results of the aggregation query is included in the result of the aggregation query because the aggregate data's classification was changed from aggregate to detail ; and
applying one or more aggregate calculation functions on top of at least a portion of pre-aggregated data, such that the pre-aggregated data is treated in the same way as detail data in the aggregate calculation functions.

15. The method of claim 14, the analyzing includes analyzing a dataset definition associated with the dataset.

16. The method of claim 14, the analyzing includes analyzing a data usage definition defining data usage of dataset fields of the dataset.

17. The method of claim 14, the analyzing includes analyzing at least one dataset field of the dataset fields to detect if at least one dataset field is used in a server aggregate function.

18. A programming interface to a data store comprising a computer readable storage medium having computer executable interface modules stored thereon for executing the method of claim 14.

19. A computer readable storage medium comprising computer executable instructions for interfacing with a data store, comprising:
means for receiving a request for at least one operation to be performed on at least one field of at least one dataset of the data store;
means for automatically determining whether a portion of aggregate data is to be re-categorized from detail data to aggregate data based on both a data usage context that indicates how the data is currently being used, processed or requested and the current scope of at lease one associated aggregation query;
means for automatically re-categorizing the aggregate data in the at least one dataset from aggregate data to non-aggregate data based on the determination by explicitly reclassifying the subset's data designation from aggregate data to detail data based on an output from the means for analyzing, the detail data comprising base level database data, the aggregate data comprising a combination of one or more portions of detail data, the usage including a user's usage of the at least one subset of data, wherein the analysis analyzes the user's usage of the data subset to determine how the user used the data subset; and means for performing an aggregation query across the detail data, the query being configured to return only detail data, wherein the aggregate data that would have otherwise been excluded from the results of the aggregation query is included in the result of the aggregation query because the aggregate data's classification was changed from aggregate to detail ; and means for applying one or more aggregate calculation functions on top of at least a portion of pre-aggregated data, such that the pre-aggregated data is treated in the same way as detail data in the aggregate calculation functions.

20. The computer readable storage medium of claim 19, the means for automatically re-categorizing the aggregate data to non-aggregate data re-categorizes when the modified dataset definition output from the means for analyzing includes a determination that no field of the at least one dataset is used in an aggregate function.

* * * * *